United States Patent [19]
Uematsu

[11] Patent Number: 5,562,351
[45] Date of Patent: Oct. 8, 1996

[54] PRINTER HAVING CONSTANT AND VARIABLE DATA MEMORY

[75] Inventor: Kaoru Uematsu, Shizuoka, Japan

[73] Assignee: Kabushiki Kaisha TEC, Shizuoka, Japan

[21] Appl. No.: 537,749

[22] PCT Filed: Mar. 17, 1995

[86] PCT No.: PCT/JP95/00460
 § 371 Date: Nov. 15, 1995
 § 102(e) Date: Nov. 15, 1995

[87] PCT Pub. No.: WO95/25012
 PCT Pub. Date: Sep. 21, 1995

[30] Foreign Application Priority Data

Mar. 17, 1994 [JP] Japan .................................... 6-046656

[51] Int. Cl.⁶ ........................................ B41J 5/30
[52] U.S. Cl. ............................. 400/68; 400/61; 395/116
[58] Field of Search ............................. 400/61, 68, 70, 400/76; 395/116, 115

[56] References Cited

U.S. PATENT DOCUMENTS 5,156,468 10/1992 Uematsu .................................... 400/68
5,401,110 3/1995 Neeley ..................................... 400/621

FOREIGN PATENT DOCUMENTS 3-127088 5/1991 Japan .

*Primary Examiner*—John S. Hilten
*Attorney, Agent, or Firm*—Oblon, Spivak, McClelland, Maier & Neustadt, P.C.

[57] ABSTRACT

A printer for continuously printing out essentially identical images with partial differences. The printer comprises a storage area (34) for storing predetermined constant data (3) and variable data (4), and at least a first and a second image data storage area (40, 41) for storing image data (2). The constant data (3) is combined with first variable data, and the combined data is stored into the first image data storage area (40) as the first image data. The first image data is then copied from the first image data storage area (40) to the second image data storage area (41). The first and the second image data storage area (40, 41) are switched by turns, and the variable data (4) within the image data (3) is updated using subsequent variable data. In parallel with the updating of the variable data (4) stored in the first image data storage area (40), the image data (2) held in the second image data storage area (41) is printed out. With only the variable data updated within the overall image data, the speed of printing out essentially identical images with partial differences is improved.

14 Claims, 8 Drawing Sheets

| No. | ADDRESS | FORMAT |
|---|---|---|
| 1 | 10, 20 | ---------- |
| 2 | 15, 50 | ---------- |
| 3 | 15, 50 | ---------- |
| 4 | 15, 50 | ---------- |
| ⋮ | ⋮ | ⋮ |

| No. | ADDRESS | FORMAT |
|---|---|---|
| 2 | 15, 50 | ---------- |
| 3 | 15, 50 | ---------- |
| 4 | 15, 50 | ---------- |
| ⋮ | ⋮ | ⋮ |

| No. | CHARACTER STRING |
|---|---|
| 1 | PRINTER |
| 2 | 001 |
| 3 | 002 |
| 4 | 003 |
| ⋮ | ⋮ |

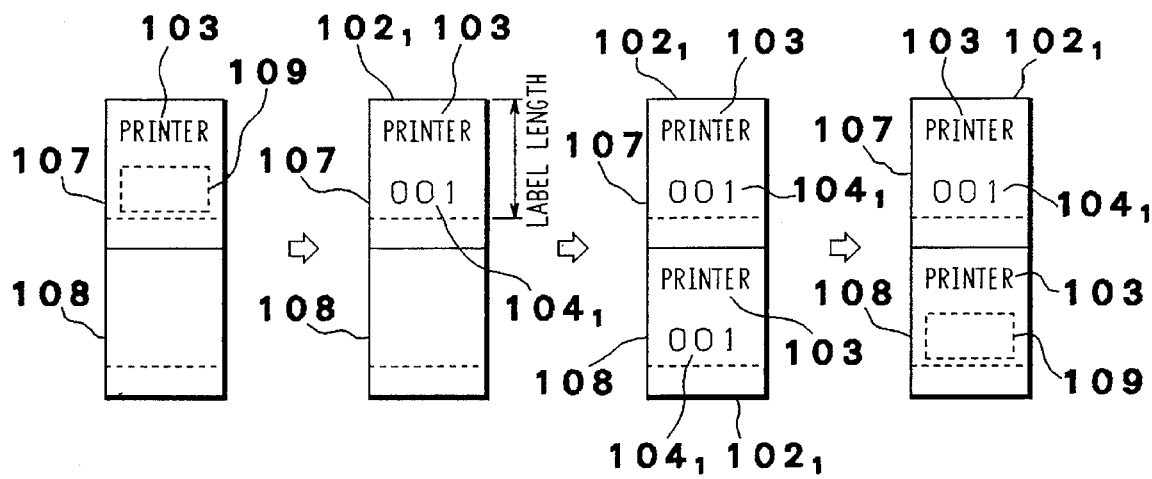
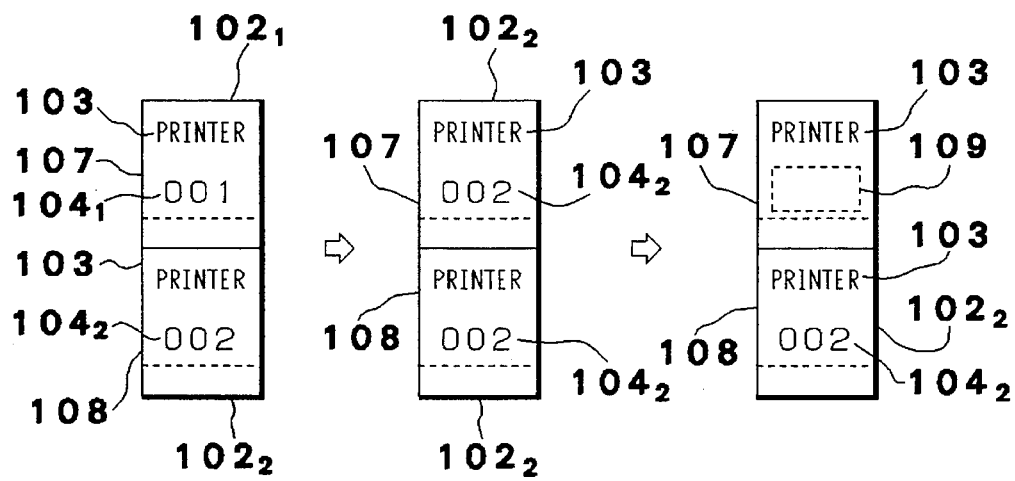

PRINTER HAVING CONSTANT AND VARIABLE DATA MEMORY

TECHNICAL FIELD

The present invention relates to a printer for continuously printing out essentially identical images with partial differences added thereto. More particularly, the invention relates to a printer incorporating improvements for performing such printing at higher speed.

BACKGROUND ART

There exist conventional label printers that print out continuously onto labels essentially identical images with partial differences added thereto. One such label printer is disclosed in U.S. Pat. No. 5,156,468. FIG. 8 shows typical labels issued by the disclosed label printer. As illustrated, essentially identical images with partial differences, i.e., "PRINTER 001," "PRINTER 002," "PRINTER 003," etc., are printed on labels $101_1$, $101_2$, $101_3$, etc.

FIGS. 9(A), 9(B) and 9(C) depict typical storage areas adopted by conventional label printers for printing out essentially identical images with partial differences. The storage area is generally constituted by a RAM (random access memory), and includes a storage area 105 for constant data 103 shown in FIG. 9 (A) and a storage area 106 for variable data 104 depicted in FIG. 9(B). The storage area 105 for the constant data 103 comprises an update field 109 that selectively accommodates one of variable data $104_1$, $104_2$, $104_3$, etc. In the example of FIGS. 9(A) through 9(C), the storage area 105 stores "PRINTER" as the constant data 103 and the storage area 106 contains "001," "002," "003," etc., as a plurality of variable data $104_1$, $104_2$, $104_3$, etc. FIG. 9(C) shows image buffers furnished in the storage areas. In these image buffers, the constant data 103 is combined with the variable data $104_1$, $104_2$, $104_3$, etc., to generate image data $102_1$, $102_2$, $102_3$, etc., representing "PRINTER 001," "PRINTER 002," "PRINTER 003," etc. Generation of the image data 102 is effected through data processing by microcomputer.

FIGS. 10(A) through 10(G) show steps to generate through an image buffer arrangement the image data for continuously printing out essentially identical images with partial differences. To execute the steps in FIGS. 10(A) through 10(G) requires providing two image buffers 107 and 108. The steps of image data generation will now be described with reference to FIGS. 8 through 10. Initially, the constant data 103 is read from the storage area 105 and placed in the first image buffer 107 (see FIG. 10(A)). The first variable data $104_1$ is then read from the storage area 106 and placed into the update field 109 within the constant data 103 placed in the first image buffer 107 (FIG. 10(B)). This generates first image data $102_1$ "PRINTER 001" in the first image buffer 107. After the first image data $102_1$ is copied to the second image buffer 108 (FIG. 10(C)), the data in the update field 109 is erased from within the constant data 103 placed in the second image buffer 108 (FIG. 10(D)). The update field 109 in this state then accommodates second variable data $104_2$ "002" read from the storage area 106 (FIG. 10(E)). In this manner, the image data $102_1$ "PRINTER 001" and the image data $102_2$ "PRINTER 002" are generated in the first and the second image buffer 107 and 108, respectively.

In parallel with the data updating steps of FIGS. 10(C) through 10(E) performed in the second image buffer 108, the image data $102_1$ generated in the first image buffer 107 is printed out. The print-out operation issues the first label $101_1$ having an image "PRINTER 001" printed thereon as shown in FIG. 8.

The step of FIG. 10(E) is followed by an update of the first image buffer 107, effected by copying thereto the image data $102_2$ from the second image buffer 108 (FIG. 10(F)). Thereafter, the data in the update field 109 is erased from within the constant data 103 placed in the second image buffer 108 (FIG. 10(G)). The update field 109 in this state then accommodates third variable data $104_3$ "003" read from the storage area 106. That is, a process equivalent to the steps of FIGS. 10(C) through 10(E) is repeated.

In parallel with the data updating steps performed in the first image buffer 107, the image data $102_2$ generated in the second image buffer 108 is printed out. The print-out operation issues the second label $101_2$ having an image "PRINTER 002" printed thereon as depicted in FIG. 8.

As outlined, new image data 102 is generated by updating only the data in the update field 109. The update is effected by copying image data generated in one image buffer to the other buffer, i.e., from buffer 107 to buffer 108 or from buffer 108 to buffer 107. While the new image data is being generated in one buffer, the image data 102 generated in the other buffer is printed out to issue the label 101. This process, carried out repeatedly, issues successively the labels $101_1$, $101_2$, $101_3$, etc., with essentially identical images printed thereon together with partial differences.

The above kind of conventional technique has the following disadvantages. To generate the image data 102 in the image buffers 107 and 108 basically involves four steps: the image data 102 is generated in one image buffer 107 or 108; the generated image data 102 is then copied to the other image buffer 108 or 107; the data of the update field 109 is erased; and new variable data 104 is placed into the cleared update field 109 (FIGS. 10(C), 10(D), 10(E) and 10(F)). However, the image data 102 placed in the area other than the update field 109 ("PRINTER" in the example of FIGS. 10(A) through 10(G)) is the constant data 103 that need not be updated by definition. Nevertheless, the constant data 103 is updated every time the new image data 102 is generated. The redundant update process involving the constant data significantly prolongs the overall processing time.

In the image buffers 107 and 108, the area in which to accommodate the variable data 104 is limited to the update field 109. It follows that the size and position of the variable data 104 are constrained by the capacity of the update field 109 in the image buffers 107 and 108. This limits the types of variable data 104 that may be placed in the image buffers 107 and 108. Attempts to place into the update field 109 variable data 104 greater in size than the capacity of the update field 109 cause the excess portion of the data 104 to be truncated. In that case, the variable data 104 cannot be generated correctly as the image data 102.

It is therefore an object of the present invention to provide a printer capable of continuously printing out at higher speed essentially identical images with partial differences.

It is another object of the present invention to provide a printer offering higher degrees of freedom in printing variable images throughout the essentially identical images.

It is a further object of the present invention to provide a printer capable of maintaining the quality of variable images printed throughout the essentially identical images.

DISCLOSURE OF INVENTION

In carrying out the invention and according to one aspect thereof, there is provided a printer for continuously printing out essentially identical images with partial differences. The printer comprises: a storage area for storing predetermined constant data and variable data; at least a first and a second image data storage area for storing image data; data storing means for generating first image data by combining the constant data with first variable data and by storing the combined data into the first and the second image data storage area; data copying means for copying the first image data from the first image data storage area to the second image data storage area, the first image data having been stored into the first image data storage area by the data storing means; data updating means for switching by turns the first and the second image data storage area and for updating the variable data within the image data with subsequent variable data; and updated image printing means for printing out the second image data held in the second image data storage area, the printing being performed in parallel with the updating of the variable data stored in the first image data storage area, the updating being effected by the data updating means. Embodied as outlined, the invention updates only the variable data within the image data so as to enhance the speed at which continuously to print out essentially identical images with partial differences.

BRIEF DESCRIPTION OF THE DRAWINGS

FIG. 4(A2) is a diagram of variable format data stored in the RAM;

FIGS. 10(A), 10(B), 10(C), 10(D), 10(E), 10(F) and 10(G) are diagrams of two image buffers in which the conventional printer generates image data alternately in order to generate the image data of FIG. 9(C).

BEST MODE FOR CARRYING OUT THE INVENTION

Figure 1A:
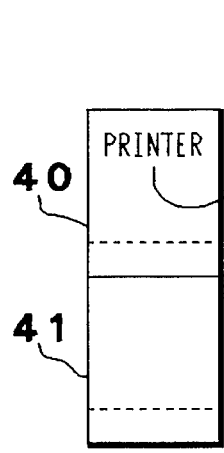
FIGS. 1(A), 1(B), 1(C), 1(D), 1(E), 1(F), 1(G) and 1(H) are diagrams of two image buffers in which to generate image data alternately and which constitute part of a label printer embodying the invention.

The preferred embodiment of the present invention will now be described with reference to FIGS. 1 through 7. This embodiment is a label printer 11 capable of continuously issuing a plurality of labels $1_1$, $1_2$, $1_3$, etc., which, as shown in FIG. 7, have essentially identical images printed thereon together with partial differences. As depicted in FIG. 2, a sheet transport mechanism 12 of the label printer 11 includes a sheet transport part 16 comprising a feed roller 18 driven by a pulse motor 17 and a platen roller 19. The sheet transport part 16 permits the selective setting of one of two kinds of sheet: a label sheet 15 made of a continuous paper mount 13 having numerous labels 1 stuck peelably thereon; or a continuous paper tag sheet, not shown, having tags formed contiguously thereon with their index portions printed individually in black.

In front of the platen roller 19 is a peeling member 20 for peeling the leading portion of each label 1 by bending at an acute angle the continuous paper mount 13 of the label sheet 15. Under the platen roller 19 is a paper mount take-up mechanism 21 for taking up the continuous paper mount 13 whose labels 1 have been peeled therefrom. The paper mount take-up mechanism 21 is made up of a guide roller 22 driven by the pulse motor 17 and a take-up roller, not shown.

A thermal head 23 acts as the print head for printing onto the labels 1 and the tags. The thermal head 23 is pressed detachably against the platen roller 19, with a transport path provided interposingly between the head and the roller for transporting the label sheet 15 or the tag sheet. An ink ribbon 27 is threaded between the platen roller 17 and the thermal head 23. The ink ribbon 27 is transported successively by a ribbon transport mechanism 28. In overlapping with the label sheet 15 or tag sheet, the ink ribbon 27 passes through the gap between the thermal head 23 and the platen roller 19. The ribbon transport mechanism 28 is driven by a support roller 24 for supporting the ink ribbon 27 in rolling fashion and by a pulse motor 26, and includes a take-up roller 25 for taking up the ink ribbon 27.

The label printer 11 has two detection parts: one comprising a transmission type optical sensor 29, the other formed by a transmission type optical sensor 30 and by a reflection type optical sensor 31. The transmission type optical sensor 29 is so located behind the thermal head 23 as to detect the ink ribbon 27. The transmission type optical sensor 30 and the reflection type optical sensor 31 are so located behind the thermal head 23 as to detect the label sheet 15 and the tag sheet. Detection of the sheet by the sensors 30 and 31 is accomplished as follows: the transmission type optical sensor 30 detects a portion of the mount 13 between two contiguous labels by sensing the transmittance of the mount portion being different from that of the labels. The reflection type optical sensor 31 detects each index portion of the tag sheet, the index portion having the higher optical absorption factor than the rest of the tag sheet. That is, the sheet is perceived by the optical sensors 30 and 31 detecting the mount 13 and the index portion as an indicator of the sheet. The size of each label 1 or tag is recognized in reference to the detected indicator, i.e., to the position of the mount 13 or the index portion.

Figure 3:
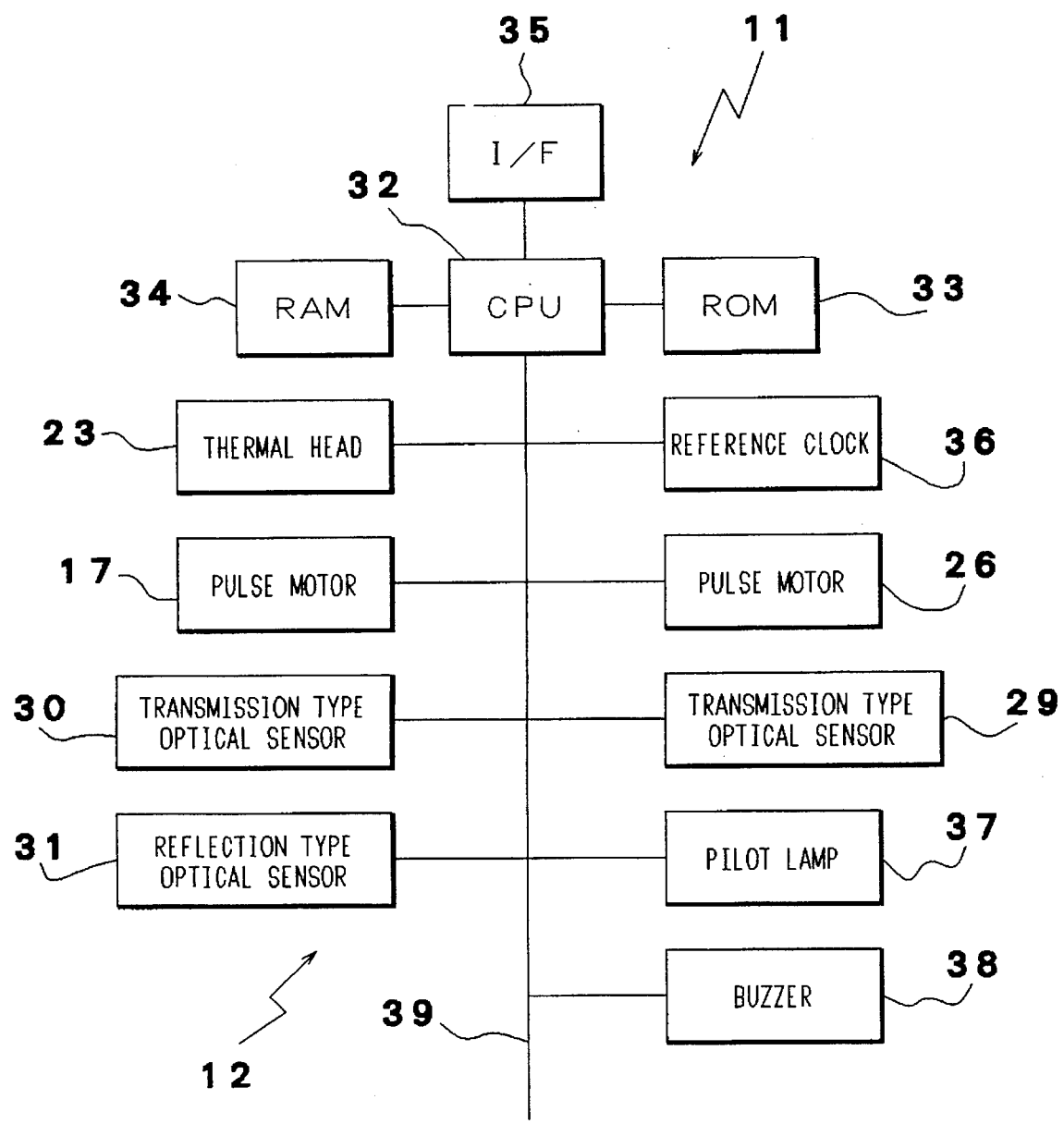
FIG. 3 is a block diagram of the hardware configuration of the label printer.
Figures 4, 4B, 4C:
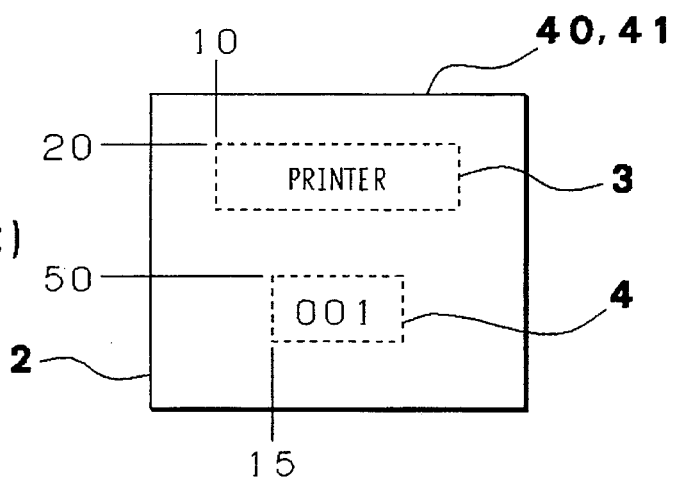
FIG. 4(A1) is a diagram of format data stored in a RAM of the label printer.
FIG. 4(B) is a diagram of actual print data stored in the RAM.
FIG. 4(C) is a diagram of an image buffer showing how actual print data is placed therein as image data according to the format data.
Figure 5:
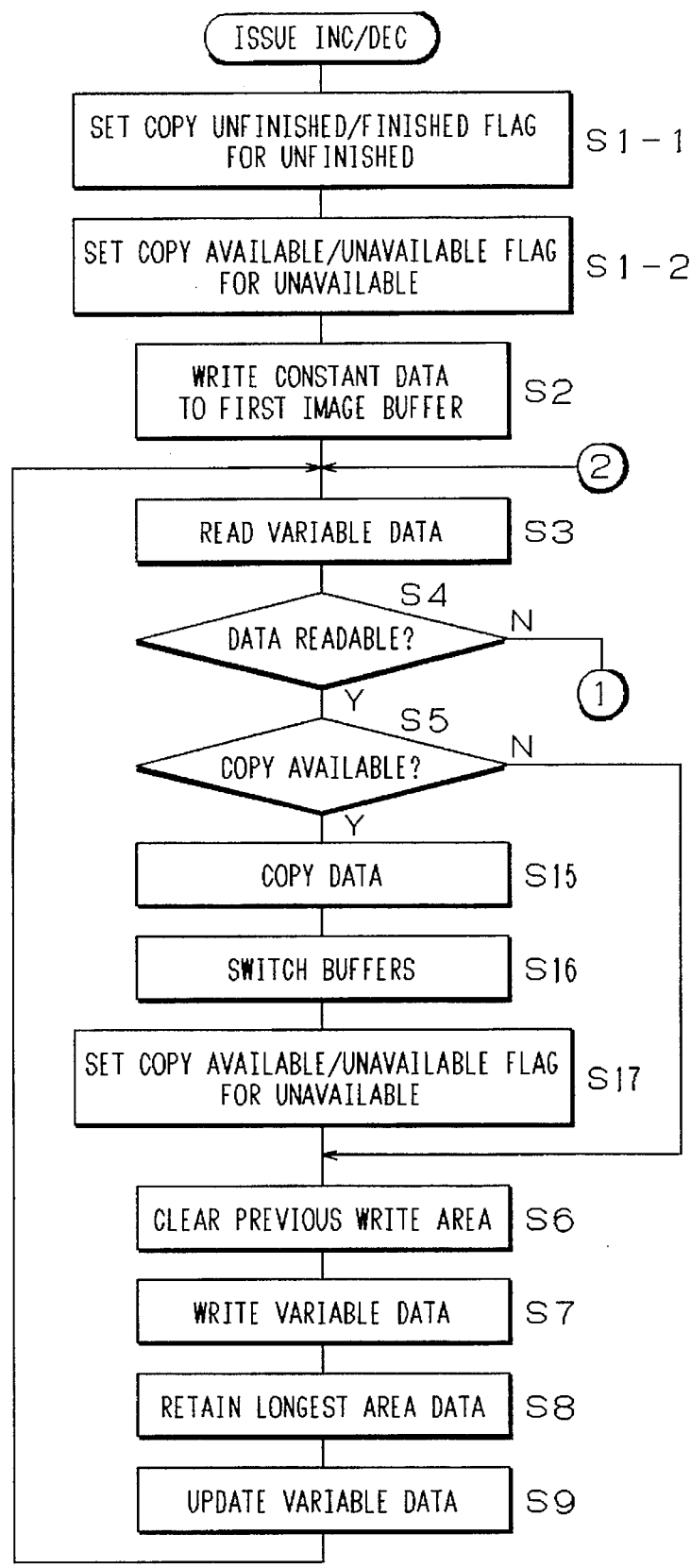
FIG. 5 is a flowchart of steps for generating image data alternately in the two image buffers.

FIG. 3 illustrates the hardware configuration of the label printer 11. The label printer 11 includes a CPU 32 that executes various kinds of data processing. The CPU 32 is connected via a system bus 39 with: a ROM (read only memory) 33 that stores beforehand and in a fixed manner diverse data including the control program; a RAM 34 that accommodates temporarily various data such as print data ready to be updated; an interface (I/F) 35 that receives print data from a host computer, not shown; a reference clock 36 that outputs clock pulses continuously; the thermal head 23; the pulse motors 17 and 26; the optical sensors 29 through 31; a pilot lamp 37 that lights as a warning or for notice; and a buzzer 38 that sounds as a warning or for notice.

Inside the RAM 34 is a storage area allocated to provide two image buffers 40 and 41 as image data storage areas (the two image buffers 40 and 41 are called the first and the second image buffer 40 and 41 for expediency hereunder). The image buffers 40 and 41 are capable of temporarily accommodating image data $2_1$, $2_2$, $2_3$, etc., ready to be updated and representing illustratively "PRINTER 001," "PRINTER 002," "PRINTER 003," etc. The image data 2 comprises constant data 3 in the form of a character string such as "PRINTER" and variable data 4 in the form of character strings such as "001," "002," "003," etc. The constant data 3 and variable data 4 are placed in the image buffers 40 and 41 in accordance with variable format data 52 and with actual print data 53. Format data 51 and the actual print data 53 are transmitted via the interface 35 from a host computer, not shown, and set ready to be updated in a predetermined storage area within the RAM 34. The variable format data 521 is prepared by the CPU 32 of the label printer 11 on the basis of the format data 51. What follows is a detailed description of how the constant data 3 and variable data 4 are placed in the image buffers 40 and 41 in accordance with the variable format data 52 and with the actual print data 53.

The actual print data 53 includes character strings 53b containing constant data 3 and variable data 4 set for each of numbers 53a. The format data 51 and variable format data 52 are data for designating where and in what form the character strings 53b are to be placed in the image buffers 40 and 41. Specifically, the format data 51 and variable format data 52 have addresses 51b and 52b and formats 51c and 52c set for each of numbers 51a and 52a. The addresses 51b and 52b are data for indicating those addresses in the image buffers 40 and 41 at which to place the character strings 53b in the actual print data 53. For example, suppose that a character string 53b "PRINTER" set for a number 53a of "1" according to the format data 51 is to be placed in the image buffers 40 and 41. In that case, because the addresses whose number 51a is "1" are 10 and 20 in the format data 52, the character string 53b is placed in the image buffers 40 and 41 starting from the location defined by an X coordinate of 10 and a Y coordinate of 20 (see FIG. 4(C)). The formats 51c and 52c are the data for designating the format in which to place the character string 53b into the image buffers 40 and 41. The stored formats 51c and 52c may include:

fonts such as Gothic and Mincho character size character string orientation (horizontal or vertical)

individual character orientation increment information

The increment information is information which specifies whether or not to increment (or decrement) successively the number 53a ranging from "2" to "n" when the variable data 4 is updated continuously in the image buffers 40 and 41 (the variable data updating process will be described later). The information also designates the units in which the number 53a is to be incremented or decremented when that number is designated to be incremented or decremented. The variable format data 52 is that extracted part of the format data 51 which comprises the format 51c containing the increment information designating the successive increment or decrement of the number.

A flag area in the RAM 34 comprises a copy unfinished/finished flag (not shown) and a copy available/unavailable flag (not shown). The copy unfinished/finished flag indicates whether or not the image data 21 held in the first image buffer 40 is to be treated as having been copied to the second image buffer 41. The copy available/unavailable flag indicates whether or not the image data 22 held in the first image buffer 40 is allowed to be copied to the second image buffer 41.

The label printer 11 has data storing means, data copying means, data updating means, updated image printing means, area retaining means and data erasing means for use by the CPU 32 carrying out its processing. The data storing means places the image data $2_1$ into the first image buffer 40 (see steps 1 and 7 in FIG. 5). The data copying means generates the image data $2_2$ by copying the image data $2_1$ held in the first image buffer 40 to the second image buffer 41 (step 15 in FIG. 5). The data updating means updates alternately the variable data 4 in the first and the second image buffer 40 and 41 (steps 6, 7, 16 and 18 in FIGS. 5 and 6). More specifically, the data updating means generates the image data $2_1$, $2_2$, $2_3$, etc., representing "PRINTER 001," "PRINTER 002," "PRINTER 003," etc., by updating the variable data $4_1$, $4_2$, $4_3$, etc., representing "001," "002," "003" etc., for selective combination with the constant data 3 representing "PRINTER." The updated image printing means prints the image data 2 placed in the first and the second image buffer 40 and 41 every time the variable data is updated by the data updating means (step 10 in FIG. 6). The area retaining means retains in the storage area of the RAM 34 the area data acquired as the longest of the repeatedly updated variable data 4 within the image data 2 (step 8 in FIG. 5). The data erasing means erases the variable data 4 from within the image data 2 in accordance with the area data (step 6 in FIG. 5).

Figure 2:
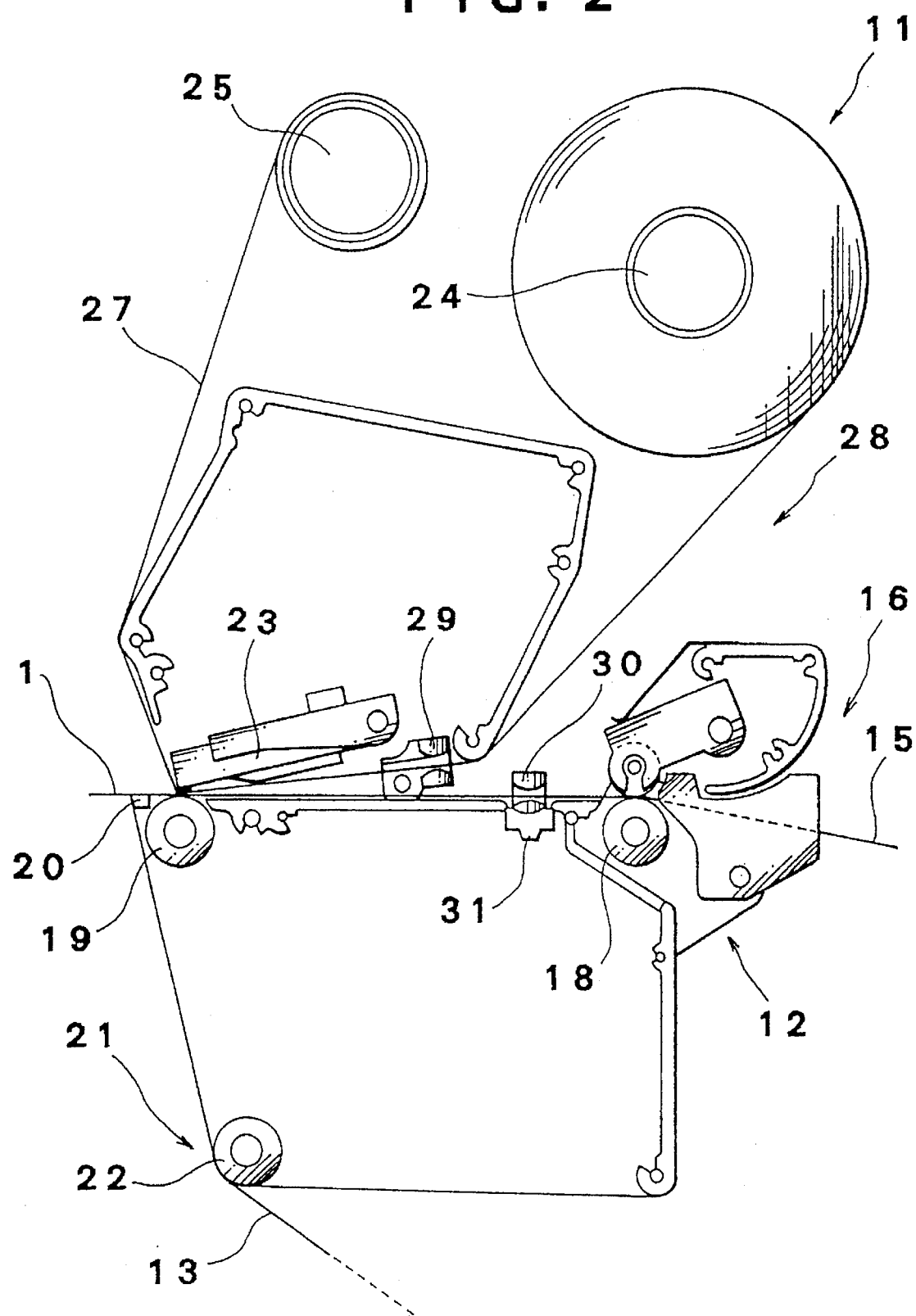
FIG. 2 is a longitudinal cross-sectional view of the internal mechanisms of the label printer.

Constituted as described, the label printer 11 embodying the invention generates new image data 2 in one of the image buffers 40 and 41 and, concurrently, prints out the image data 2 already placed in the other image buffer 40 or 41. The printer thus rapidly issues the labels $1_1$, $1_2$, $1_3$, etc., with essentially identical images printed thereon together with partial differences. FIGS. 1(A) through 1(H) show conceptually how an image writing process takes place in the image buffers 40 and 41. The process involves the following steps:

(1) The constant data 3 "PRINTER" is written to the first image buffer 40 (FIG. 1(A)).

Figure 1B:
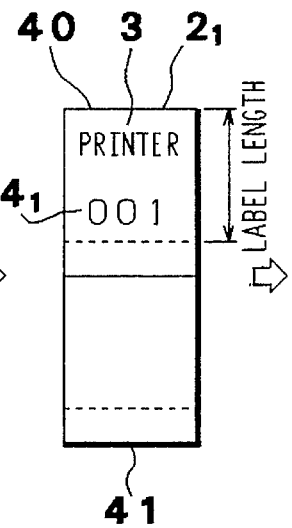

(2) The variable data 41 to be printed first, "001," is written to the first image buffer 40, thereby generating the image data 21 "PRINTER 001" (FIG. 1(B)).

Figure 1C:
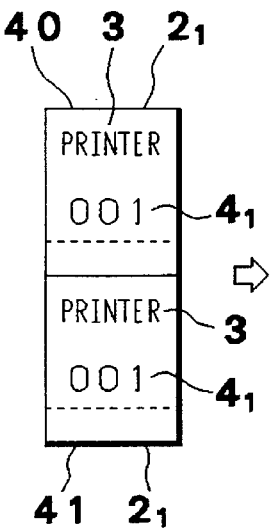

(3) The image data 21 placed in the first image buffer 40 is copied to the second image buffer (FIG. 1(C)).

Figure 1D:
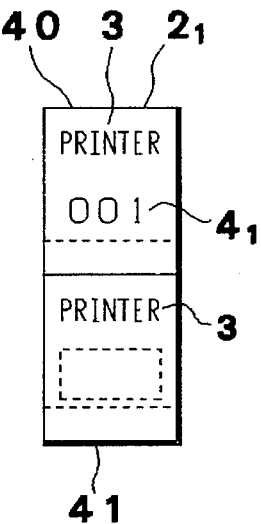

(4) The variable data 41 "001" written in the second image buffer 41 is erased (FIG. 1(D)).

Figure 1E:
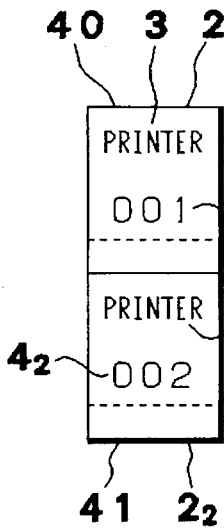

(5) The variable data $4_2$ to be printed second, "002," is written to the appropriate area of the now-cleared second image buffer 41, thereby writing the image data $2_2$ "PRINTER 002" (FIG. 1(E)).

Figure 1F:
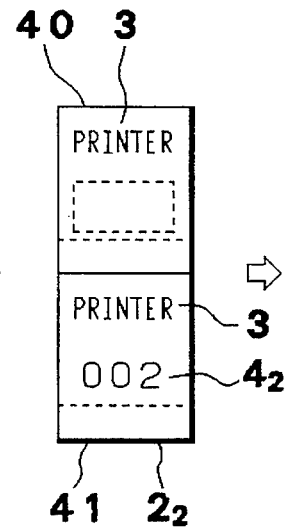

(6) The variable data $4_2$ "002" written in the first image buffer 40 is erased (FIG. 1(F)).

Figure 1G:
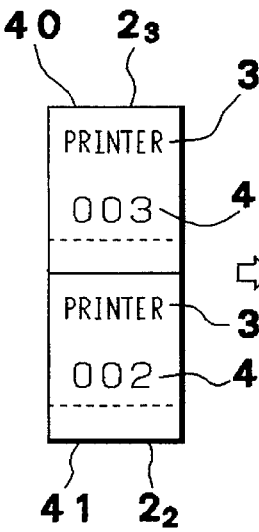

(7) The variable data $4_3$ to be printed third, "003," written to the appropriate area of the now-cleared first image buffer 40, thereby writing the image data $2_3$ "PRINTER 003" (FIG. 1(G)).

Figure 1H:
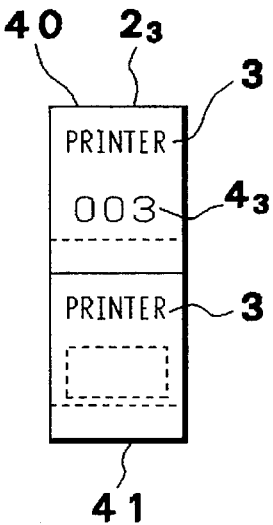

(8) The variable data $4_2$ "002" written in the second image buffer 41 is erased (FIG. 1(H)).

During the write process of the image buffers 40 and 41, the updating of the variable data 4 proceeds in parallel with the print-out of the image data 2 containing the currently unchanged variable data 4. This makes it possible to issue rapidly the labels $1_1$, $1_2$, $1_3$, etc., with essentially identical images printed thereon together with partial differences. The label issuing process will be described below in more detail with reference to the flowcharts of FIGS. 5 and 6.

[Writing the constant data to the image buffer; see FIG. 1(A).]

It is presupposed that the host computer, not shown, has transmitted the format data 51 and actual print data 53 into the RAM 34 and that the variable format data 52 has been generated on the basis of the format data 51.

When the label printer 1 receives a print instruction from the host computer, the copy unfinished/finished flag in the RAM 34 is set for ∂unfinished" (step 1-1) and the copy available/unavailable flag is set for "unavailable" (step 1-2). In step 2, the character string 53b "PRINTER" of the constant data 3 in the actual print data 53 is written to the first image buffer 40. That is, the constant data "PRINTER" is placed in the first image buffer 40 as shown in FIG. 1(A).

[Writing the variable data to the image buffer; see FIG. 1(B).]

In step 3, a read instruction is issued to read the first variable data 41 ("001" in this example). In step 4, a check is made to see if the variable data 41 is readable. Whether or not the variable data 41 is readable depends on whether or not the variable data $4_1$ is inhibited from being written in step 9, to be described later. If the variable data 41 is found to be readable in step 4, step 5 is reached. In step 5, a check is made on the copy available/unavailable flag. In this case, step 5 is followed by step 6 because the copy available/ unavailable flag was set for "unavailable" in step 1-2. In step 6, the variable data 4 is erased from a previous write area in the image buffer 40. The previous write area is determined in accordance with the area data and will be described later in more detail. In step 7, the variable data for which the read instruction was issued in step 3 is written to the first image buffer 40. At this point, the image data representing the character string 53b "001," i.e., the first variable data in the actual print data 53, is written to the first image buffer 40 according to the variable format data 52. As a result, the image data 21 combining the constant data 3 "PRINTER" with the variable data 4 "001" is generated in the first image buffer 40, as depicted in FIG. 1(B).

In step 8, the format 52c in the variable format data 52 utilized in generating the image data 2 is referenced so that the character size therein is compared with the area data. As mentioned earlier, the area data is the longest of the repeatedly updated variable data 4 within the image data 2. Thus the RAM 34 accommodates as the area data the size of the longest variable data 4 from among the variable data 4 repeatedly updated so far. Because the previous write area (see step 6) is determined in accordance with the area data, the process in step 6 of clearing the previous write area recognized as per the area data always erases the entire variable data 4 previously written in the image buffers 40 and 41.

In step 9, the variable data 4 written in the image buffer 40 in step 7 is inhibited from being read again. Step 9 is followed retrogressively by step 3 in which another read instruction is issued to read the first variable data $4_1$. Because further reading of the variable data $4_1$ has been inhibited since step 9, a check in step 4 on the variable data $4_1$ reveals that the reading of the data is impossible. Step 4 is then followed by step 10 in FIG. 6.

[Print-out of image data onto label]

Figure 6:
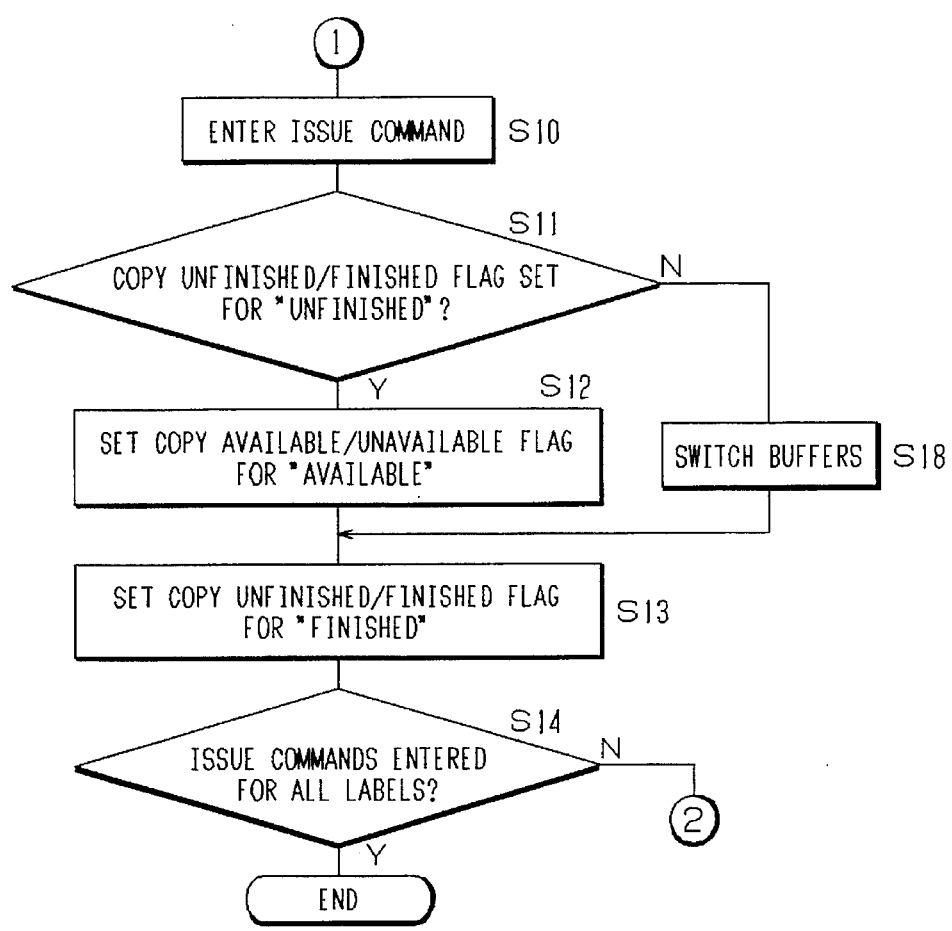
FIG. 6 is a flowchart of steps continued from the flowchart of FIG. 5.
Figure 7:
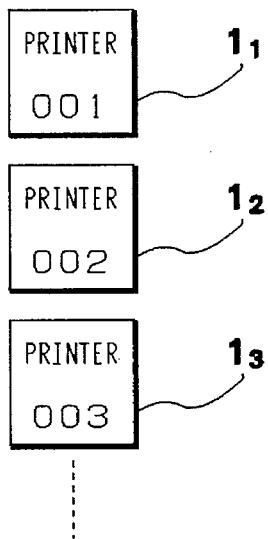
FIG. 7 is a plan view of labels typically issued according to the invention.
Figure 8:
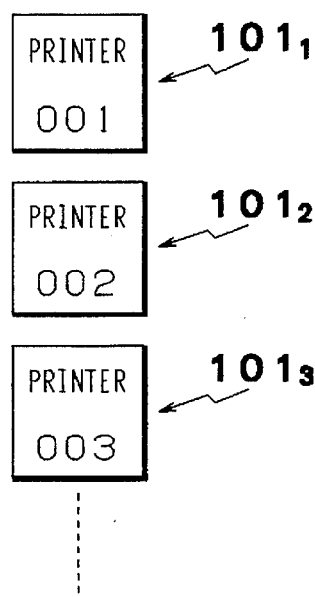
FIG. 8 is a plan view of conventionally issued labels.
Figure 9A:
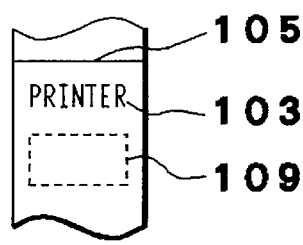
FIG. 9(A) is a diagram of constant data that a conventional printer possesses in order to issue the labels shown in FIG. 8.
Figure 9B:
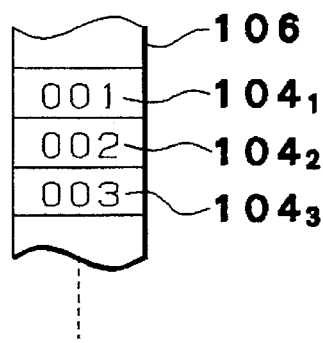
FIG. 9(B) is a diagram of variable data that the conventional printer possesses in order to issue the labels of FIG. 8.
Figure 9C:
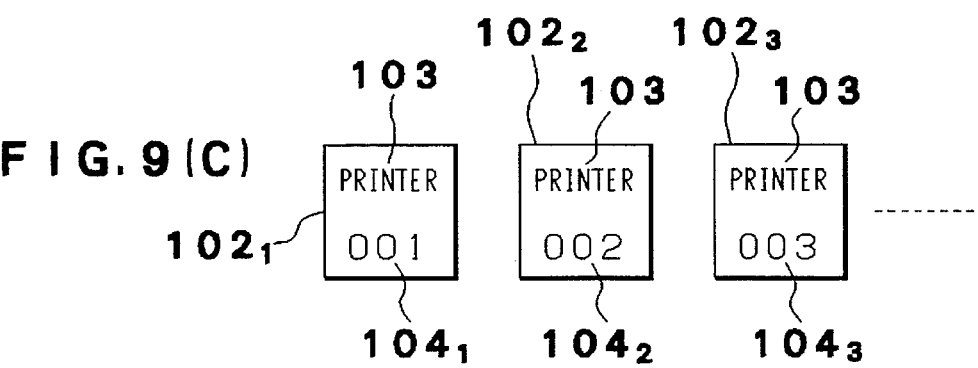
FIG. 9(C) is a diagram of image data placed in an image buffer of the conventional printer so as to issue the labels of FIG. 8.

In step 10 of FIG. 6, when the image data $2_1$ is generated in the first image buffer 40, an issue command for issuing the label 1 based on the image data 21 is entered into an appropriate area in the RAM 34. The issue command is entered every time the image data ($2_1$, $2_2$, $2_3$, etc.,) is generated. With the issue command thus entered, the corresponding image data 2 is printed out onto the label 1, whereby the label $1_1$ shown in FIG. 7 is issued. This print-out process is carried out apart from the process of generating the image data 2, i.e., through interruption by the CPU 32 at predetermined intervals. Alternatively, the printing may be performed by a separately furnished CPU, not shown.

[Preparations for printing out essentially identical images with partial differences]

With the issue command entered, step 11 is reached. In step 11, a check is made to see if the copy unfinished/ finished flag is set for "unfinished." When the flag is indeed found to be set for "unfinished," step 12 is reached in which the copy available/unavailable flag set for "unavailable" in step 1-2 is now set for "available." In step 13, the copy unfinished/finished flag set for "unfinished" in step 1-1 is now set for "finished." In step 14, a check is made to see if the issue commands have been entered for all labels $1_1$, $1_2$, $1_3$, etc., to be issued. Control is passed back repeatedly to step 3 until the issue commands are verified to have been entered for all labels. At this point, the increment information in the format 52c within the variable format data 52 is referenced. That is, the variable data 4 for which the read instruction is issued in step 3 upon return of control thereto is determined in accordance with the increment information in the format 52c included in the variable format data 52 regarding the variable data 4 within the image data 2 for which the issue command has been entered in step 10. For example, suppose that the variable data 4 is "001" and that the increment information specifies "1" as the unit in which the number 53a is to be incremented. In that case, in step 3 following step 14, the read instruction is issued to read the variable data 22 ("002"). Whether or not all issue commands have been entered is also verified based on the increment information in the format 52c included in the variable format data 52.

[Copying the image data; see FIG. 1(C).]

In step 3 following step 14, the read instruction is issued to read the variable data $4_2$ subsequent to the variable data 41 written in the first image buffer 40. In step 5 following the above-mentioned process of step 4, a check is made on the copy available/unavailable flag. Since the copy available/ unavailable flag was set for "available" in step 12, step 5 is followed by step 15. In step 15, the image data 21 generated in the first image buffer 40 is copied to the second image buffer 41 (FIG. 1(C)). In step 16, the first image buffer 40 is replaced by the second image buffer 41 for data processing execution. In step 17, the copy available/unavailable flag set for "available" in step 12 is now set for "unavailable."

[Clearing the variable data area in the copied image data; see FIG. 1(D)).]

In step 6, the previous write area is cleared from within the image data 21 copied from the first image buffer 40 to the second image buffer 41. This leaves the two image buffers 40 and 41 in the state shown in FIG. 1(D).

[Writing new variable data onto image data; see FIG. 1(E).]

In step 7, the variable data $4_2$ for which the read instruction was issued in step 3 is written to the second image buffer 41. This combines the constant data 3 "PRINTER" with the variable data $4_2$ "002" to generate the image data $2_2$ "PRINTER 002" in the second image buffer 41.

[Print-out of new image data onto label]

Generation of the image data $2_2$ in step 7 is followed by the above-described processes of steps 7 through 9, 3, 4 and 10, in that order. In step 10, the issue command for issuing the label 1 based on the image data $2_2$ is entered. This causes the content of the image data $2_2$ to be printed onto the label 1, whereby the label $1_2$ depicted in FIG. 7 is issued.

[Updating image data]

Thereafter, only the variable data 4 in the image data 2 is updated successively. Specifically, since the copy unfinished/finished flag was set for "finished" in step 13, a check on that flag in step 11 is followed by step 18. In step 18, the second image buffer 41 is replaced by the first image buffer 40 for data processing execution. Step 18 is followed by steps 14 and 3 for reading the variable data 43, by steps 4 and 5 for their respective checks, and by the process in step 6 of clearing the previous write area. This leaves the two image buffers 40 and 41 in the state illustrated in FIG. 1(F). Step 6 is followed by step 7 in which the variable data 43 is written to the first image buffer 40 to generate the image data 23. This puts the two image buffers 40 and 41 in the state pictured in FIG. 1(G). The image data 23 is then printed out onto the label 1 by the entry of the issue command in step 10. In parallel with the print-out, the previous write area is cleared from within the image data 22 generated in the second image buffer 41 as shown in FIG. 1(H). That is, only the variable data 4 in the image data 2 is updated successively, and new image data 2 is generated alternately in the two image buffers 40 and 41. In parallel with the generation of the image data 2, the image data 2 whose variable data 4 has yet to be updated is printed out. It follows that in the process following FIG. 1(F), the constant data 3 that need not be changed remains unchanged. This enhances the speed of processing.

The label printer 11 embodying the invention has its area data set to be the size of the longest of the variable data 4 utilized so far in generating the image data 2. It is according to the area data that the variable data 4 is erased from the image data 2 (step 6). Thus suppose that the write area size is varied from one variable data item 4 to another so that, say, proportional printing with constant character spacing may be implemented. In that case, new variable data 4 can be written without letting the previously utilized variable data 4 remain on both ends of the image buffer area. Moreover, the speed of processing is not adversely affected because there is no need to clear a needlessly wide data area.

The label printer 11 offers significantly extensive printable lengths, ranging illustratively from 5 cm to 30 cm, for the labels 1 and tags to be issued. This requires furnishing a RAM 34 whose image write memory capacity for the image buffers 40 and 41 is at least the same as the maximum printable size of the labels 1 and tags. On the other hand, the memory capacity should preferably be minimized by allocating only an image write memory portion whose capacity corresponds to the largest printable label 1 or tag. The requirements are met by the label printer 11 carrying out the invention as described: where relatively short labels 1 or tags (e.g., less than half the maximum printable size) are to be printed, two image buffers 40 and 41 are provided, and the image data 2 generated in one image buffer 40 or 41 is copied to the other image buffer 41 or 40. This allows the label printer 11 to increase the speed of processing appreciably while making maximum use of the capacity of the image write memory. As such, the embodiment of the invention offers enhanced basic performance of the printer which is fabricated using inexpensive component parts. Illustratively, when the inventive printer is used to issue a large number of labels 1 or tags with product serial numbers (variable data) and a product name (constant data) printed thereon, the time required for generating the image data 2 is reduced drastically and the speed of printing (in terms of length printed per second) is enhanced significantly. This is but one example in which the features of this label printer 1 are utilized effectively.

Although the description above contains many specificities, these should not be construed as limiting the scope of the invention but as merely providing illustrations of the presently preferred embodiment of this invention. For example, although the updating of the variable data 2 in the image data 2 was shown to be effected by first erasing the variable data 4 and then by writing new variable data (steps 6 and 7) in its place, this is not limitative of the invention. Alternatively, the new variable data 4 may be written in overlapping fashion onto the previously written variable data 4 for the update.

The area data described above may alternatively be constituted by the character size of the variable data 4 which is placed in the image buffers 40 and 41 until the clearing of the previous write area in step 6. In such a case, the format 52c included in the variable format data 52 regarding the variable data 4 used to generate the image data 2 is referenced in step 8. The referenced character size in the format 52c is taken as the area data. Thus the clearing in step 6 of the previous write area erases all variable data 4 written in the image buffers 40 and 41.

Another alternative is to prepare in advance the image data $2_1$ such as "PRINTER 001" in the process of FIGS. 1(A) and 1(B).

In addition to the above application in the label printer, the invention may be applied to various other printers including a ticket printer and a page printer in which specific print conditions are set for desired purposes.

Thus the scope of the invention should be determined by the appended claims and their legal equivalents, rather than by the examples given.

I claim:

1. A printer for continuously printing out essentially identical images with partial differences, said printer comprising:

a storage area (34) for storing predetermined constant data (3) and variable data (4);

at least a first and a second image data storage area (40, 41) for storing image data (2);

data storing means for generating first image data by combining said constant data (3) with first variable data and by storing the combined data into said first image data storage area (40);

data copying means for copying said first image data from said first image data storage area (40) to said second image data storage area (41), said first image data having been stored into said first image data storage area (40) by said data storing means;

data updating means for switching by turns at least said first and said second image data storage area (40, 41) and for updating said variable data (4) within said image data (3) with subsequent variable data; and updated image printing means for printing out said image data (2) held in said second image data storage area (41), said printing being performed in parallel with the updating of said variable data (4) stored in said first image data storage area (40), said updating being effected by said data updating means.

2. A printer according to claim 1, wherein said data updating means erases said variable data (4) from an image buffer inside any of said first and said second image data storage area (40, 41) and writes said subsequent variable data to said image buffer in place of the erased variable data.

3. A printer according to claim 2, wherein said data updating means erases said variable data (4) from a minimum area comprising said variable data (4) to be erased.

4. A printer according to claim 2, further comprising area data for accommodating the size data derived from said variable data (4) placed in said image buffer, wherein the erasure of said variable data (4) is effected on the basis of said size data held in said area data.

5. A printer according to claim 1, wherein the number of said image data storage areas is limited to two.

6. A printer according to claim 1, wherein said storage area stores said constant data (3) and said first variable data in combination.

7. A printer according to claim 1, wherein said data storing means stores initially said constant data (3) into said first image data storage area (40) and then said variable data (4) into the same area.

8. A printer according to claim 1, wherein said data storing means stores as said first variable data a plurality of variable data into said first image data storage area (40), and wherein said data updating means updates said variable data (4) within the currently stored image data with said plurality of variable data as said subsequent variable data.

9. A printer according to claim 1, wherein said data updating means updates said variable data (4), which is held in said first and said second image data storage area (40, 41), in the order in which said variable data (4) was stored therein.

10. A printer according to claim 1, wherein said image data (2) is generated in said first and said second image data storage area (40, 41) through single task processing.

11. A printer according to claim 1, wherein said first image data storage area (40) is divided into a plurality of image data storage areas.

12. A printer according to claim 1, wherein said storage area (34) stores actual print data (53) and format data (51, 52), said actual print data (53) constituting the contents of said constant data (3) and said variable data (4), said format data (51, 52) including the formats of said constant data (3) and said variable data (4), and wherein said data storing means and said data updating means store said actual print data (53) as said constant data (3) and said variable data (4) into said first and said second image data storage area (40, 41) in accordance with said format data (51, 52).

13. A printer according to claim 12, wherein said format data (51, 52) includes increment information for defining the unit in which said variable data (4) is either incremented or decremented, and wherein said data updating means selects as said subsequent variable data the variable data numbered as defined by said increment information.

14. A printer for continuously printing out essentially identical images with partial differences onto a sheet (15) formed longitudinally, said printer comprising:

sensors (30, 31) for detecting markings arranged at constant intervals on said sheet (15);

recognizing means for recognizing as an issuing unit (1) each of those segments of said sheet (15) which are delimited by said markings detected by said sensors;

a storage area (34) for storing predetermined constant data (3) and variable data (4);

at least a first and a second image data storage area (40, 41) for storing image data (2) corresponding to each of said segments of said sheet (15);

data storing means for generating first image data by combining said constant data (3) with first variable data and by storing the combined data into said first image data storage area (40);

data copying means for copying said first image data from said first image data storage area (40) to said second image data storage area (41), said first image data having been stored into said first image data storage area (40) by said data storing means;

data updating means for switching by turns at least said first and said second image data storage area (40, 41) and for updating said variable data (4) within said image data (3) with subsequent variable data; and updated image printing means for printing out said image data (2) held in said second image data storage area (41), said printing being performed in parallel with the updating of said variable data (4) stored in said first image data storage area (40), said updating being effected by said data updating means.

\* \* \* \* \*